United States Patent
Carrasco Zanini et al.

(10) Patent No.: US 10,481,604 B2
(45) Date of Patent: Nov. 19, 2019

(54) HIGH ACCURACY REMOTE COORDINATE MACHINE

(71) Applicant: Saudi Arabian Oil Company, Dhahran (SA)

(72) Inventors: Pablo Carrasco Zanini, Thuwal (SA); Fadl Abdellatif, Thuwal (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/387,734

(22) Filed: Apr. 18, 2019

(65) Prior Publication Data

US 2019/0243366 A1 Aug. 8, 2019

Related U.S. Application Data

(63) Continuation of application No. 15/685,789, filed on Aug. 24, 2017, now Pat. No. 10,338,592.

(51) Int. Cl.
*G05D 1/00* (2006.01)
*G01S 7/497* (2006.01)
(Continued)

(52) U.S. Cl.
CPC .......... *G05D 1/0094* (2013.01); *G01S 7/4808* (2013.01); *G01S 7/497* (2013.01);
(Continued)

(58) Field of Classification Search
CPC .... G05D 1/0094; G05D 1/0088; G01S 7/497; B64C 2201/141
(Continued)

(56) References Cited

U.S. PATENT DOCUMENTS 7,184,072 B1 * 2/2007 Loewen ................. G01C 11/02
348/140
7,805,851 B2 10/2010 Pettersson
(Continued)

FOREIGN PATENT DOCUMENTS

EP 3165945 A1 5/2017
WO WO 2017/093453 A1 6/2017

OTHER PUBLICATIONS

Karpowicz, J., "Figuring Out Aerial Surveying with a Drone Instead of Arguing About Photogrammetry vs LiDAR," retrieved from www.expouau.com/news/latest/events/commercial-uav-expo-2016/. Aug. 23, 2016.
(Continued)

*Primary Examiner* — Muhammad Shafi
(74) *Attorney, Agent, or Firm* — Leason Ellis LLP

(57) ABSTRACT

A method of calibrating a structure is provided. The method includes securing a first end of a tether to a device at a fixed location on an external surface of the structure, attaching an unmanned aerial vehicle to the second end of the tether, moving the unmanned aerial vehicle in a trajectory around the structure while tethered to the fixed device, scanning the external surface of the structure over a course of the trajectory using the unmanned aerial vehicle to obtain a mapping of the external surface of the structure, determining a position of the unmanned aerial vehicle with respect to the fixed device; and calibrating the structure based on i) the determined position of the unmanned aerial vehicle with respect to the fixed device, and ii) the mapping of external surface of the structure.

6 Claims, 6 Drawing Sheets

(51) Int. Cl.
*G01S 17/42* (2006.01)
*G01S 17/66* (2006.01)
*G01S 17/89* (2006.01)
*G01S 7/48* (2006.01)

(52) U.S. Cl.
CPC .............. *G01S 17/42* (2013.01); *G01S 17/66* (2013.01); *G01S 17/89* (2013.01); *G05D 1/0088* (2013.01); *B64C 2201/141* (2013.01)

(58) Field of Classification Search
USPC .......................................................... 701/2
See application file for complete search history.

(56) References Cited

U.S. PATENT DOCUMENTS

| | | | |
|---|---|---|---|
| 9,619,265 | B2 | 4/2017 | Kruglick |
| 2007/0247615 | A1 | 10/2007 | Bridges |
| 2011/0043515 | A1 | 2/2011 | Stathis |
| 2011/0202224 | A1 | 8/2011 | Thompson et al. |
| 2012/0212627 | A1* | 8/2012 | Klose ................... H04N 9/3182 348/189 |
| 2013/0233964 | A1 | 9/2013 | Woodworth et al. |
| 2014/0032021 | A1 | 1/2014 | Metzler et al. |
| 2014/0046589 | A1 | 2/2014 | Metzler et al. |
| 2014/0163775 | A1 | 6/2014 | Metzler |
| 2014/0267627 | A1* | 9/2014 | Freeman ............... G01S 17/023 348/47 |
| 2016/0292872 | A1* | 10/2016 | Hammond .............. G01S 17/66 |
| 2016/0320775 | A1 | 11/2016 | Priest |
| 2016/0340006 | A1 | 11/2016 | Tang |
| 2017/0142596 | A1* | 5/2017 | Priest .................... H04W 16/18 |

OTHER PUBLICATIONS

Sadikin, H. et al., "UAV System With Terrestrial Geo—referencing for Small Area Mapping ," FIG Congress 2014, Engaging the Challenges—Enhancing the Relevance, Kulal Lumpur, Malaysia 16-21, p. 1-13, Jun. 2014.

Martinez, J.L. et al., "Progress in Mini-Helicopter Tracking with a 3D Laser Range-Finder," University of Malaga, Dept of System Engineering and Automation Industrial Engineering School, p. 1-6. 2005.

Rosnell, T. et al., "Point Cloud Generation from Aerial Image Data Acquired by a Quadrocopter Type Micro Unmanned Aerial Vehicle and a Digital Still Camera," Sensors, vol. 12, p. 453-480. 2012.

Mondragon, I. et al., "3D pose estimation based on planar object tracking for UAVs control," Computer Vision Group, Universidad Politecnica de Madrid. 2007.

Hexagon Manufacturing Intelligence, "Leica T-Scan 5" Url:www.hexagonml.com/en-GB/products/3d-laser-scanners/leica-tscan5 accessed on Sep. 19, 2017.

Merrett Survey Ltd Website, Home Page Url: http://www.merretsurvey.com/lidar.htm accessed on Sep. 19, 2017.

3DR, "How to Get Started with Drones for Surveying and Mapping" Url: https://3dr.com/enterprise/industries/survey-mapping/, accessed on Sep. 19, 2017.

* cited by examiner

HIGH ACCURACY REMOTE COORDINATE MACHINE

CROSS REFERENCE TO RELATED APPLICATIONS

The present application is a continuation application of U.S. patent application Ser. No. 15/685,789 filed on Aug. 24, 2017, entitled HIGH ACCURACY REMOTE COORDINATE MACHINE which is hereby incorporated by reference as if set forth in its entirety herein.

FIELD OF THE INVENTION

The present invention relates to structural calibration and mapping methods, and in particular relates to a technique that uses an unmanned aerial vehicle (UAV) to map large objects in three-dimensions.

BACKGROUND OF THE INVENTION

In the oil and gas industry the volume of storage tanks is calibrated periodically in order to be able to accurately determine the amount of fuel stored in the tank. Typically, a level gauge is used to determine the amount of fuel in a tank. However, storage tanks located in environments subject to high average temperatures tend to expand non-uniformly. The expansions are often difficult to measure accurately and can have an appreciable effect on the total volume. When the volume of a tank changes, the accuracy of standard gauge readings, which are based on a static volume of the tank, diminish. Inaccurate fuel level readings can lead to systematic undervaluation of fuel assets and consequent loss of revenue during custodial transfers.

Increasing the frequency of tank calibration could improve accuracy and yield financial benefits. However, commonly-used calibration techniques typically take an unduly long time to perform, e.g., 3 to 8 hours per tank. These lengthy techniques cause considerable disruption to the operation of the tanks, which can be scheduled for product transfers almost continuously.

What is therefore needed is a calibration technique applicable to large structures such as storage tanks that is both highly accurate and has minimal impact to their operation.

SUMMARY OF THE INVENTION

Embodiments of the present invention provide a method of calibrating a structure. The method includes securing a first end of a tether to a device at a fixed location on an external surface of the structure, attaching an unmanned aerial vehicle to the second end of the tether, moving the unmanned aerial vehicle in a trajectory around the structure while tethered to the fixed device, scanning the external surface of the structure over a course of the trajectory using the unmanned aerial vehicle to obtain a mapping of the external surface of the structure, determining a position of the unmanned aerial vehicle with respect to the fixed device; and calibrating the structure based on i) the determined position of the unmanned aerial vehicle with respect to the fixed device, and ii) the mapping of external surface of the structure.

In some implementations of the method, the trajectory of the unmanned aerial vehicle around the structure is a circular path. The fixed device can be situated on a top surface of the structure.

In some embodiments, the fixed device includes a laser scanner and the unmanned aerial vehicle includes a mounted reflector. The laser scanner and mounted reflector together establish a position of the unmanned aerial vehicle relative to the fixed device.

In other embodiments, the fixed device includes a tether spool having an angular encoder, and a strain sensor. In such embodiments, the strain on the tether using the strain sensor is measured using the strain sensor and the distance between the unmanned aerial vehicle and the fixed device is determined based on the measured strain. In addition, the angular position of the unmanned aerial vehicle and the fixed device is determined using the angular encoder.

In some implementations, the unmanned aerial vehicle can include a laser scanning device that creates a point cloud of the external surface of the structure during scanning. The unmanned aerial vehicle can also include three thrusters.

Embodiments of the present invention also provide a system for calibrating a structure. The system includes a device located at a fixed location on an external surface of the structure, a tether having first and second ends and secured at the first end to the fixed device, and an unmanned aerial vehicle attached to the second end of the tether, the unmanned aerial vehicle including a scanning device. The unmanned aerial vehicle is operative to move in a trajectory around the structure while tethered to the fixed device and to scan the external surface of the structure over a course of the trajectory to obtain a mapping of the external surface of the structure. The structure is calibrated based on i) the known position of the unmanned aerial vehicle with respect to the fixed device, and ii) the mapping of external surface of the structure.

The unmanned aerial vehicle can include a plurality of thrusters, and is operative to control the thrusters to maintain tension in the tether so as to move in a circular trajectory and in some implementations, the fixed device is situated on a top surface of the structure.

In some embodiments, the fixed device includes a laser scanner and the unmanned aerial vehicle includes a mounted reflector, and the laser scanner and mounted reflector together establish a position of the unmanned aerial vehicle relative to the fixed device.

In other embodiments, the fixed device includes a tether spool, an angular encoder, and a strain sensor. In some implementations, the strain sensor is operative to measure a strain on the tether, and a distance between the unmanned aerial vehicle and the fixed device is determined based on the measured strain. The angular encoder can be used to determine the angular position of the unmanned vehicle relative to the fixed device.

The scanning device of the unmanned aerial vehicle can be implemented as a LiDAR device, and the unmanned aerial vehicle can be implemented as a tricopter with three thrusters.

Any combinations of the various embodiments and implementations disclosed herein can be used.

These and other aspects, features, and advantages can be appreciated from the following description of certain embodiments of the invention and the accompanying drawing figures and claims.

It is noted that the drawings are illustrative and not necessarily to scale.

DETAILED DESCRIPTION CERTAIN OF EMBODIMENTS OF THE INVENTION

By way of overview, the present disclosure describes a method and system for calibrating a structure, such as a fuel storage tank. An unmanned aerial vehicle (sometimes referred to as a drone, but hereinafter referred to as a "UAV") is tethered to a fixed point on the structure and travels around the structure in a trajectory while tethered. The UAV scans the external surface of the structure while traversing the trajectory. The tethering of the structure to the fixed point creates a coordinate reference frame since the precise location of the UAV with respect to the fixed point at any time can be accurately measured. Accordingly, the scanned data of the surface of the structure can be automatically converted into spatial coordinates within the reference frame. Since the UAV is tethered during its trajectory, maintaining unassisted stability is unnecessary, and unconventional UAV designs can be employed, including three-thruster (tricopter) designs.

Figure 1:
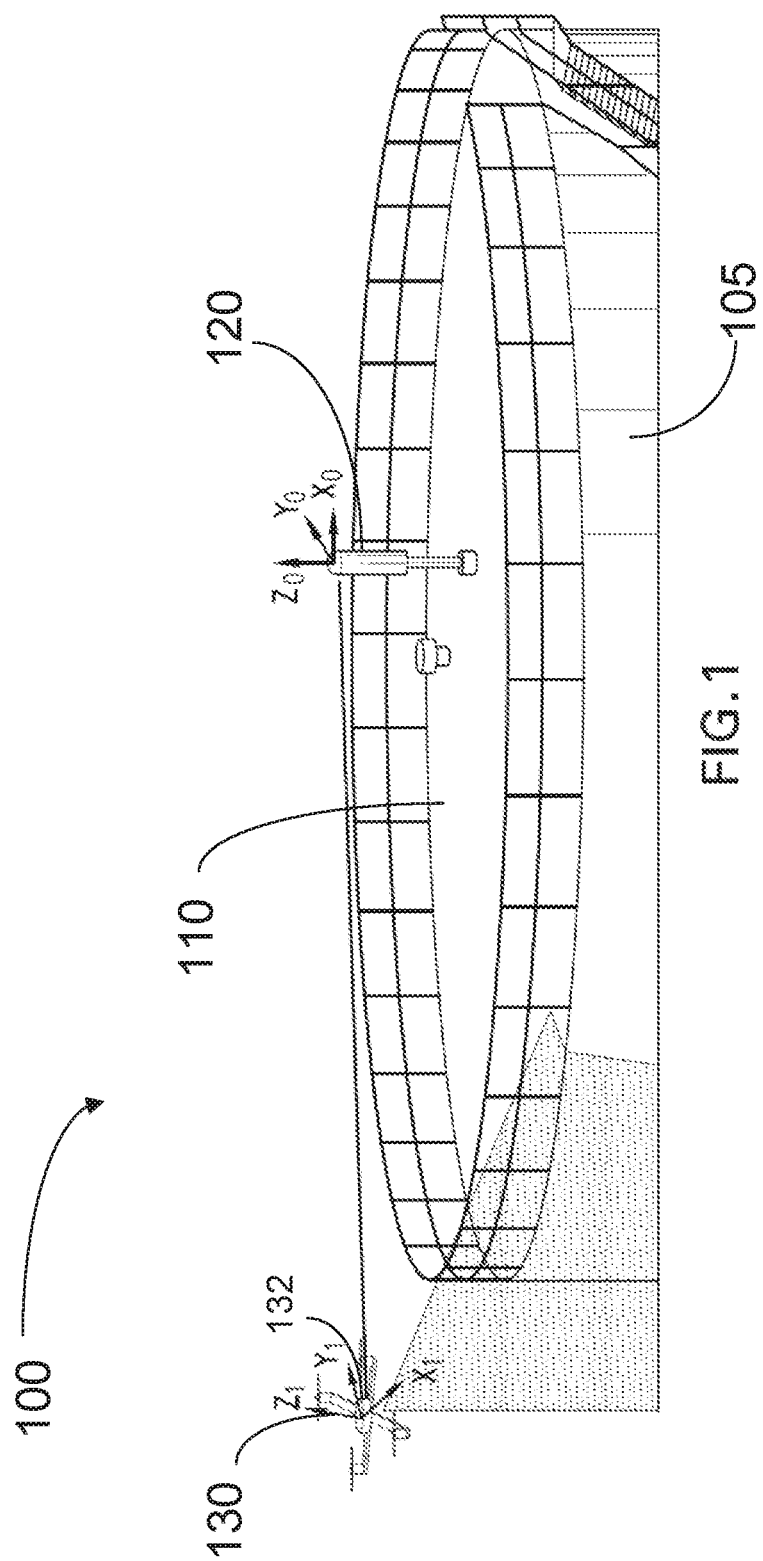
FIG. 1 is a perspective view of an exemplary embodiment of a system for calibrating a structure according to the present invention.

FIG. 1 is a perspective view of an exemplary embodiment of a system for calibrating a structure according to the present invention. In FIG. 1, a calibration system 100 is shown being used to calibrate structure 105, which in this example is a fuel storage tank. The structure has a top surface 110 on which a fixed device 120 is secured using a tripod or other stable platform, or by a fixture. The fixed device 120 can also be secured to other parts of structure 105. The fixed device 120 is coupled to a first end of a tether 125. A second end of tether 125 is coupled to a UAV 130. The tether 125 is preferably light-weight, flexible, non-extendable and strong enough to withstand force sufficient to maintain the tether in a state of tension at full stretch. As shown in FIG. 1, the tether 125 is extended and under tension. Either the fixed device 120 or UAV 130 (or both) can include a strain sensor adapted to measure a tension on the tether as it is suspended between the fixed device and the UAV. The tether can be coupled to a retractable spool mounted to either the fixed device 120 or the UAV 130 or it can be unwound manually.

In general, it is preferable for the tether to have a length greater than a radius of the structure to be calibrated so that the UAV clears the edge of the structure sufficiently to be able to scan the entire external surface of the structure. The UAV 130 is capable of traveling airborne in a trajectory around the structure 105 while attached to the tether 125. UAV 130 also includes a scanning device (not shown in FIG. 1) for capturing precise information regarding the dimensions of the structure. In some implementations, the scanning device is a laser (LiDAR) scanner and the data captured using the scanner comprises a high-resolution point cloud or mapping, of the structure 105. The cloud resolution (point-to-point) distance can be approximately one centimeter (~1 cm) and the precision of each point can be approximately one millimeter (~1 mm). The laser scanner can be a 2-dimensional LiDAR system that is adapted to map sets of point along a cross-section between a scanning plane and the structure. The 2-dimensional cross-section can be combined into a 3-dimensional mapping.

In some embodiments, the UAV 130 includes an externally mounted reflector 132. In such embodiments, the fixed device 120 can be implemented as a laser tracker, such as, for example, a Leica Absolute Tracker AT402, AT930 or AT960, with six degrees of freedom. The tracker 120 is configured to determine the precise position of the reflector relative to the tracker and the reflector 132 using interferometry. The UAV 130 can be coupled to the tether 125 so as to force the reflector 132 to face toward the tracker 120 while the UAV is deployed for scanning.

Figure 2:
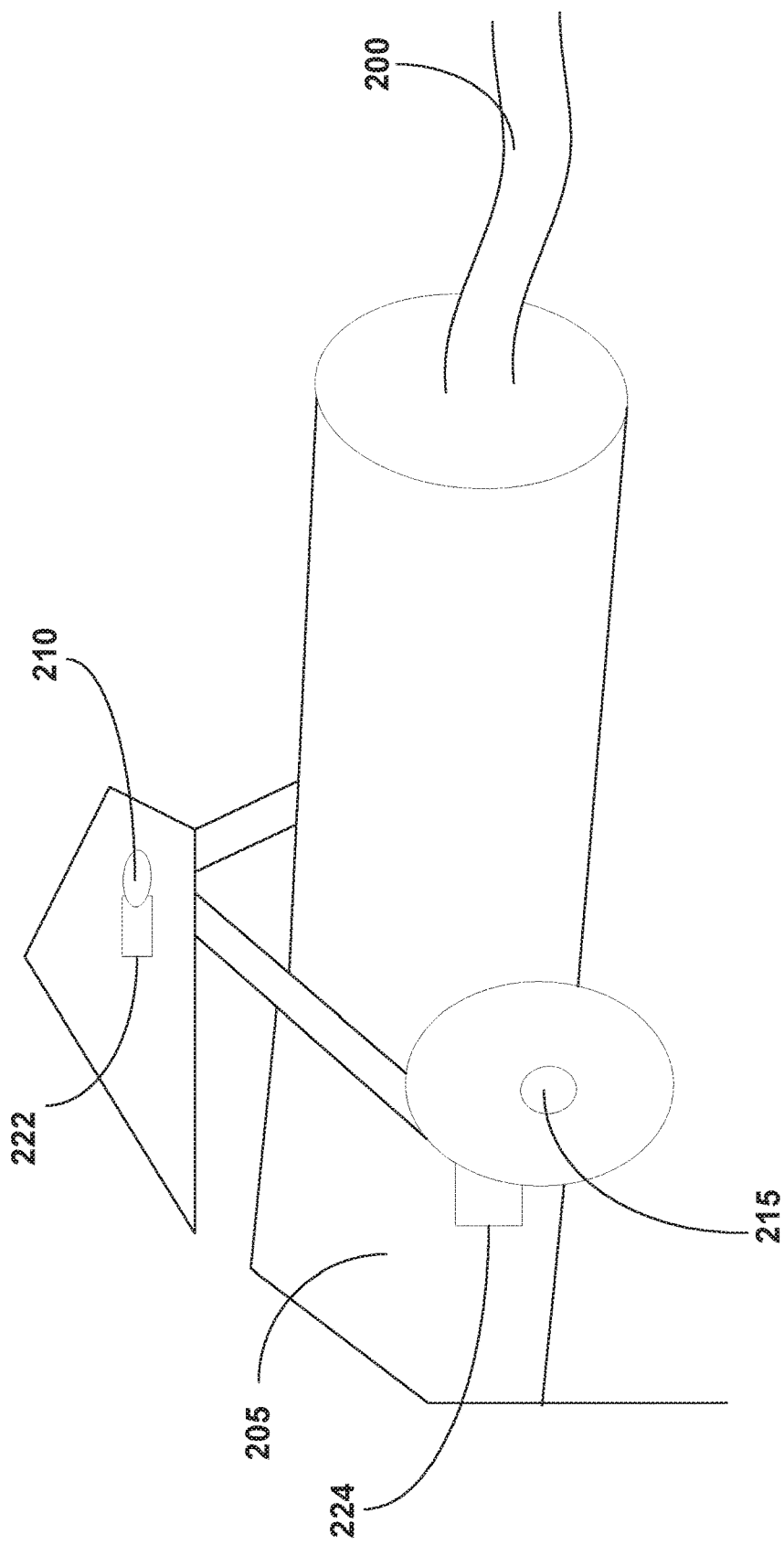
FIG. 2 is a schematic perspective view of an embodiment of a fixed device according to an embodiment of the present invention.

In another embodiment, motion of the tether itself, in combination with strain sensor and angular encoders, can be used to track the location of the drone instead of a laser tracker. One example embodiment of a fixed device based on this principle is shown schematically in FIG. 2. As depicted, a tether 200 is coupled to and extends from a fixed device 205 (referred to as a "station") that can be coupled to a spool (not shown in FIG. 2). The station 205 is mounted to a first bearing 210 that provides freedom of rotation for the station in the azimuthal direction (horizontal plane). A second bearing 215 provides freedom of rotation in a perpendicular plane that changes the orientation of the station in terms of altitude. The rotatable bearings allow the tether to rotate along with the UAV as it travels in its trajectory in both the horizontal plane and vertically. In some implementations, station 205 includes a distance encoder and/or strain sensor (not shown) that dynamically measures the length of the tether as it is unwound from a spool. For a tether with a relatively short length, a strain sensor can measure a tension on the tether indicating that the tether has been extended to or close to its full length. For a tether with a large spool, a distance encoder can be used to directly measure the length unwound, and can activate a clamp mechanism to stop a further unwinding of the spool to maintain the tether at a fixed length. Alternatively, the distance between the fixed device and UAV can be preset by fixing the length of the tether and extending the tether to its maximum length.

In addition, the station can include a first encoder 222 coupled to the first bearing 210 that measures the azimuthal angle of the tether as the station rotates with respect to the first bearing. Station 205 can also include a second encoder 224 coupled to the second bearing 215 that measures the altitude angle of the tether as the station rotates with respect to the second bearing. In alternative implementations, sensors on the UAV 130 can be used in conjunction with or as a substitute for the encoders. For example, the rather than an altitude angle encoder, the station can include an altitude sensor that indicates the altitude of the station itself on the structure, and the UAV can include a similar altitude sensor. The difference between the altitudes measured at the station and the UAV indicates the angle of the tether between the station and the UAV. In still other implementations, the orientation of the UAV with respect to the station can be measured using inertial measurement units (IMUS) on board of the UAV.

Figure 3:
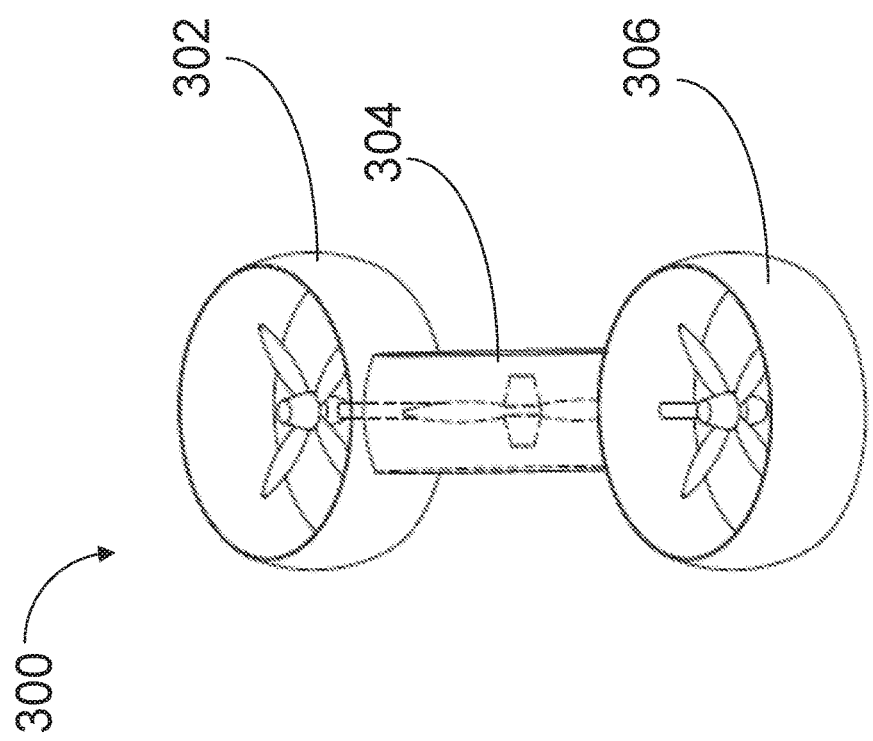
FIG. 3 is a perspective view of a tricopter that can be used as a UAV according to embodiments of the present invention.

The UAV 130 can be implemented using unconventional, simplified rotor configurations since it is tethered. In order to maintain stability over a trajectory, the UAV only needs to have the ability to thrust away from the fixed device to maintain the tension on the tether, and to control the angular direction (clockwise versus counterclockwise) of the trajectory. These conditions can be accomplished using three thrusters (rotors). FIG. 3 shows a perspective view of a tricopter 300 that can be used for the UAV in embodiments of the present invention. Tricopter 300 includes a first end thruster 302 which provides thrust in a vertical direction, a central thruster 304 which provides thrust in a horizontal direction, and a second end thruster 306 which also provides thrust in a vertical direction. The central thruster 304 is used to impel in a horizontal direction the tricopter away from the structure to maintain tension on the tether. The first and second end thrusters 302, 306 can be used to adjust the altitude of the tricopter and also to adjust the angular orientation of the tricopter 300 with respect to the horizontal plane. (referred to as the "attitude"). For example, the attitude can be adjusted by providing downward thrust using first end thruster 302 simultaneously with an upward thrust using second end thruster 306.

In operation, prior to a scanning run, the system 100 is initialized so that the fixed device is enabled to track the UAV. During an initialization stage, the UAV is first coupled to the tether 125 at an initial location. When the fixed device 120 is implemented using a laser tracker, the reflector 132 of the UAV is located, and the orientation of the UAV 130 with respect to the fixed device 120 is determined. The initial location can be a pre-assigned "perch" location which is stored in the memory of the tracker. In this case, the location of the UAV is spotted by the tracker automatically. However, using a pre-assigned location is not necessary; rather as long as the reflector of the UAV is in a line of sight of the tracker, the orientation of the UAV can be determined. When the fixed device is implemented using angular encoders, the encoders determine the orientation. The UAV can then be tracked start from the point that it departs from the perch location. In other implementations, an operator can position the UAV relative to the laser tracker, manually or by remote control, so that a beam from the tracker intercepts the reflector of the UAV. After interception, the operator can issue a command for the UAV to lift off. Once airborne, the UAV can be configured (i.e., programmed) to move away from the fixed device up to a point that either a threshold tension is detected via a strain sensor positioned on either the fixed device or the UAV, or the limit of the tether is reached and the UAV cannot move further away from the fixed device.

Additionally, since there is a tendency for the tether to sag as it is suspended between the fixed device and the UAV, and the degree of sag affects the distance between the fixed device and UAV, it is advantageous to compensate for this factor. According to the physics of suspended lines, which is well known, the amount of sag is a function of the tension on the tether. The tension can be measured with the strain sensor, which, as noted, can be included on either the fixed device or UAV (or both). Once measured, the amount of the sag, and the amount that the sag reduces the distance between the fixed device and the UAV, is determined. If the sag is determined to be beyond a threshold magnitude, the UAV thrusters are activated to increase the tension on the tether.

Once the initialization has taken place, the UAV travels in a trajectory around the structure and scans the structure, preferably using LiDAR scanning (although other scanning and imaging modes can be used). In many instances, the UAV travels in a circular trajectory with the fixed device as the center, keeping the tension on the tether constant or nearly constant, and thus maintaining a consistent distance from the fixed center. However, depending on the exact location of the fixed device with respect to the structure, the trajectory can vary from circularity, and the tension on the tether can be reduced as necessary for periods of time. To maintain the trajectory, the thrusters of the UAV are activated to continuously thrust away from the fixed device to sustain the tension on the tether and also to thrust upwardly to keep the UAV airborne.

Figure 4:
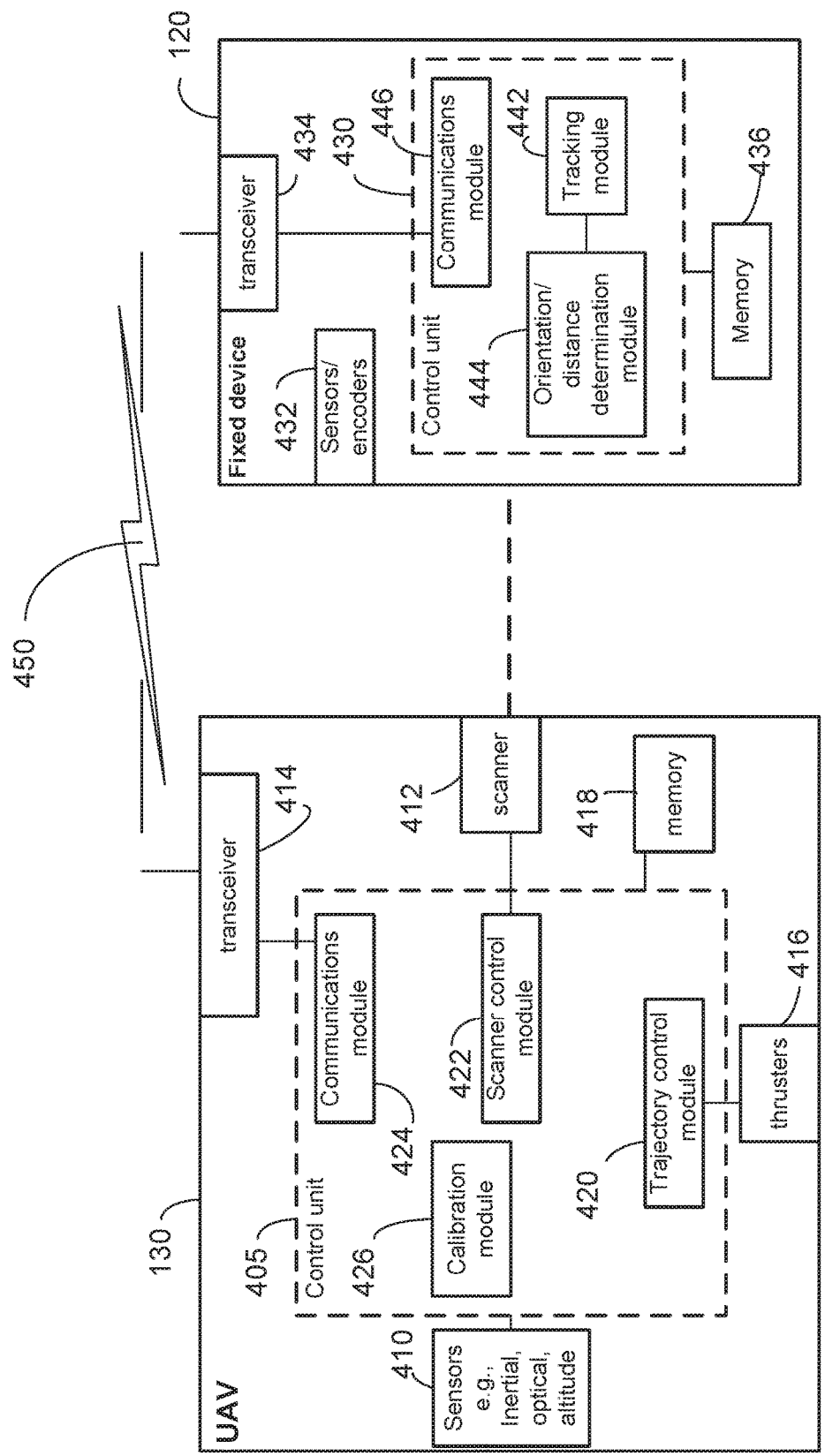
FIG. 4 is a schematic block diagram of a control system for calibrating a structure according to an embodiment of the present invention.

FIG. 4 is a schematic block diagram of a control system for calibrating a structure according to an embodiment of the present invention. As shown, UAV 130 includes a control unit 405, a group of sensors 410, a scanner 412, a transceiver 414, thrusters 416 and on-board memory 418. The control unit 405, which can be implemented using a microprocessor, programmable logic units and/or application specific circuitry, is configured with program modules. The program modules include a trajectory control module 420, a scanner control module 422, a communications module 424 and a calibration module. The sensors 410 can include inertial measurement units, pressure/strain sensors, optical sensors, altitude sensors, remote control sensors, etc. Data receives by sensor 410 is transmitted to the control unit 405 for further processing.

In operation the control unit 405 employs the trajectory control module 422 to control thrusters 416 either automatically or in response to commands received from an operator (e.g., by remote control). The trajectory control module 420 includes logic for controlling the thrusters to maintain the UAV in a particular trajectory while tethered. The scanner control module 422 is used to control the operation of scanner 412, which obtains a series of cross-sectional mappings of the external surface of the structure as the UAV traverses a trajectory around the structure. In this manner, the trajectory control module 420 and the scanner control module 422 operate in tandem to ensure that entire surface of the structure is scanned. The communications module 424 operates transceiver 414 which is adapted to communicate wirelessly via Wi-fi, Bluetooth or other suitable communication mode. The calibration module 426 generates a complete 3-D mapping of the external surface of the structure based using the scanned data and data received form the fixed device.

Figure 5:
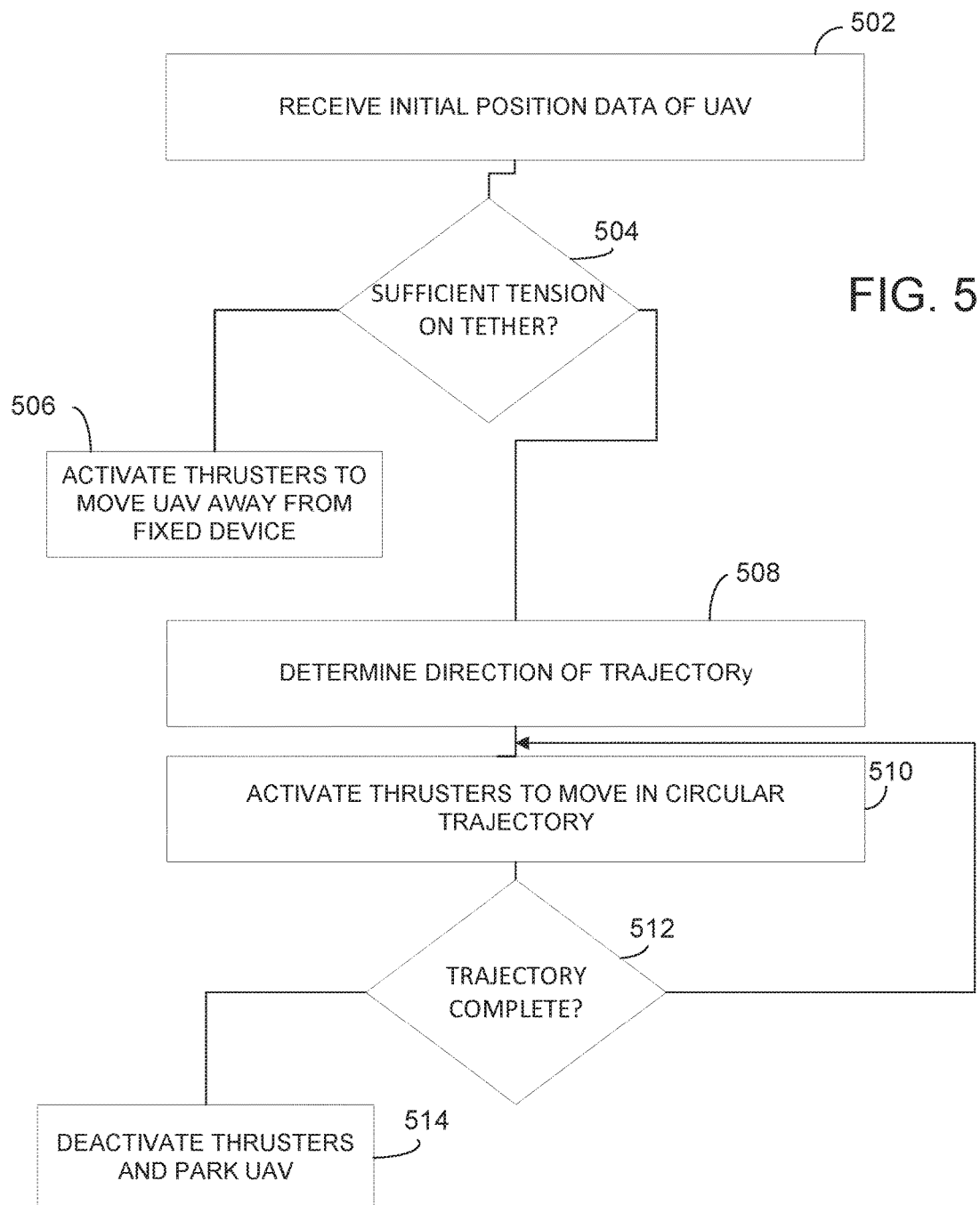
FIG. 5 is a flow chart of an exemplary embodiment of a method for propelling the UAV in a circular trajectory around the structure according to the present invention.

According to one embodiment, the trajectory control module 420 executes an algorithm for propelling the UAV in a circular trajectory around the structure. A flow chart of an exemplary embodiment of the algorithm is shown in FIG. 5. In an initial step 502, the thruster module receives data regarding the current position (starting position) of the UAV with respect to the fixed device. In the next step 504, the UAV determines whether there is sufficient tension on the tether based on input received from strain sensors. If there is not sufficient tension, in step 506, the thruster module drives a thruster (the central thruster for implementations using a tricopter) to move the UAV away from the fixed device to increase the tension on the tether to a sufficient level. If it is determined that there is sufficient tension or after step 506, in step 508, the thruster module determines based on operator commands or preset instructions, the direction in which to traverse a circular trajectory, clockwise versus counterclockwise. Simultaneously, scanning module is activated to begin scanning the structure (independently of the thruster module). After determining a direction, in step 510 the thruster module activates the thrusters so as to travel at an approximately steady circumferential speed that is preset or selected by the operator. For tricopter implementations, the side thrusters are activated to accelerate the UAV to start the circumferential motion and then the amount of force can be reduced to achieve a steady speed. While the UAV is traveling along the trajectory it continuously receives data regarding its position from its own sensors and from the fixed device. Based on this data, the thruster module determines, in step 512, whether the UAV has reached the initial position and traversed the entire circumference of the structure. The thruster module then determines, based on operator commands or preset instructions, whether to deactivate the thrusters (step 514) and park the UAV on a surface or to restart the trajectory (cycling back to step 510) and perform another scan run. Multiple scan runs can be performed to increase the amount of scan data for reducing possible errors and increasing overall scan accuracy.

The UAV 130 is coupled to the fixed device 120 by tether 125. Fixed device 120 in turn includes a control unit 430, a group of sensors 432, a transceiver 434, and memory 436. The control unit 430 can be implemented using a processor, programming logic units or specialized circuits is configured with program modules, including a tracking module 442, an orientation/distance determining module 444 and a communications module 446. Sensors 432 can include, but are not limited to a LiDAR tracker, angular encoders and a strain sensor (depending on the implementation of the fixed device employed).

In operation, for embodiments of the fixed device that employ a laser tracker, the control unit 430 uses the tracking module 442 to locate and thereafter track a reflector on the UAV. The orientation/distance determining module utilizes data received by the laser tracker or from the sensors 432 to determine the instantaneous orientation and distance of the UAV with respect to the fixed device. This information is continuously (ever small time increments) stored in memory 436 and is transmitted to the UAV via communication module 446 and transceiver 434.

The method of the present invention provides a highly accurate calibration of the structure by cross-referencing the scanned data obtained by the UAV and the orientation and distance data obtained by the fixed device (or a combination of the UAV and the fixed device). During the trajectory of the UAV around a structure, a low-latency communication link 450 can be established between the UAV 130 and fixed device 120. The communication link 450 enables the fixed device 120 to continuously transmit information to the UAV 130 while the UAV scans the structure. The calibration module 426 of the UAV uses the information received from the fixed device to cross-reference the scanned data into a reference frame in real time.

In alternative embodiments, the communication modules 424, 444 of the UAV and fixed device perform a time-synchronization over the communication link 450. The fixed device then accumulates data over the trajectory of the UAV and the data is time stamped. The accumulated data is then sent to the UAV. The UAV cross-references the accumulated information with scanned data according to the time stamp, and thereby correlates a particular scan with an associated orientation of the UAV in the fixed reference frame. The ability to cross-reference this information dispenses with the need to stitch scanned point sets together in a registration process. Once the orientation information and scanned data are fully cross-referenced, an accurate 3-D mapping of the structure can be rendered, and the volume of the structure can be calibrated using the 3-D mapping by the calibration module.

Figure 6:
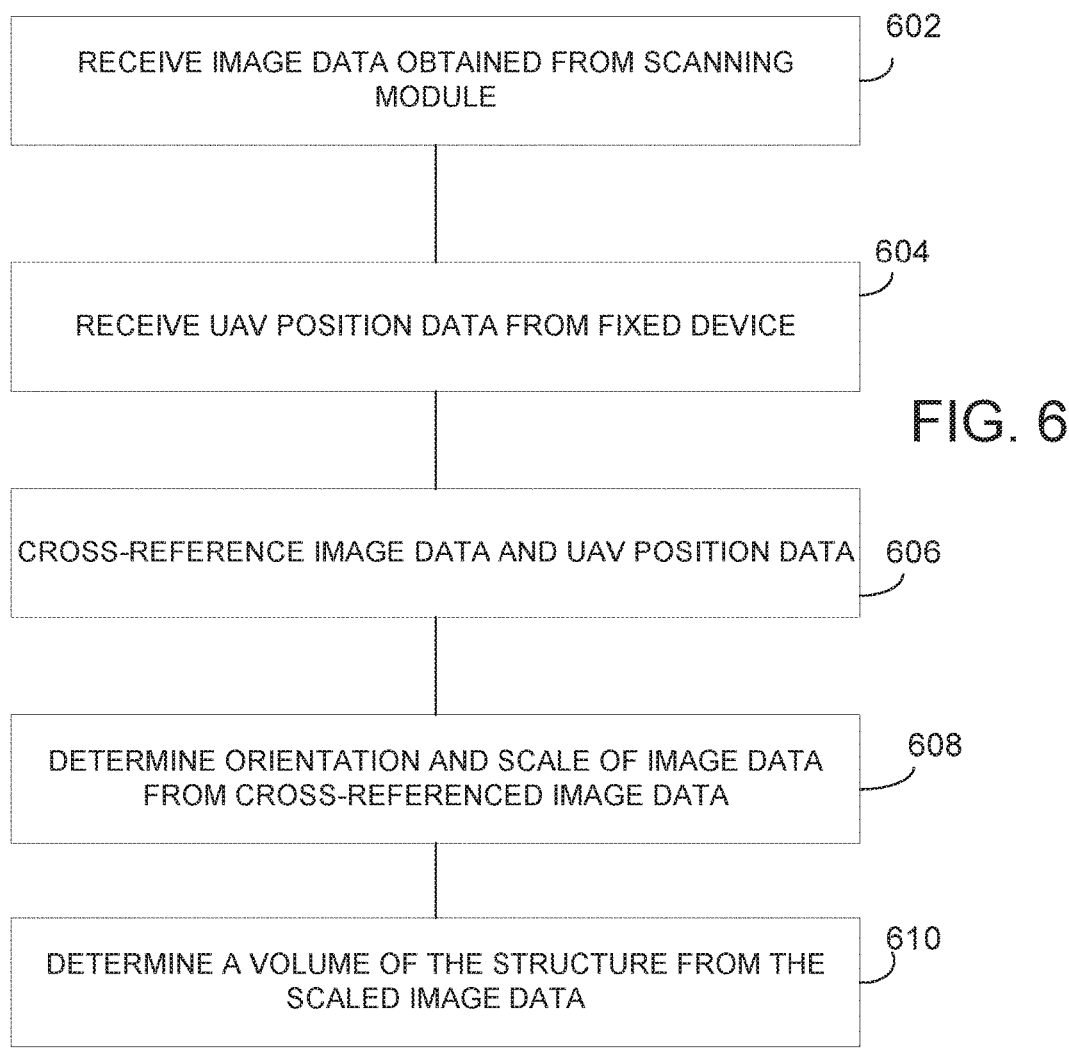
FIG. 6 is a flow chart of an exemplary embodiment of a data calibration method according to the present invention.

A flow chart of an embodiment of an algorithm performed by the calibration module 426 is shown in FIG. 6. In a first step 602, the calibration module receives the image data obtained from the scanning module, including time data for associated with each scan. In a second step 604, the calibration module receives UAV position information received from the fixed device. The UAV position information indicates the position of the UAV relative to the fixed device, also including time data. In step 606, the calibration module cross-references the image data and the position data by matching time data, and thereby, in step 608 determines both an accurate scale and orientation of the images of the structure in the reference frame of the fixed device. In step 610, using the scaled and referenced image data, the calibration module determines an estimate of the volume of the structure.

It is noted that while the systems and methods disclosed herein are particularly suitable for calibrating storage tanks used in the oil and gas industry, it is to be understood that the systems and methods can be usefully applied to calibrating other structures such as, for example, large machinery, landmarks, and large format artwork.

The method and system of the present invention provide a number of advantages. The methods of the present invention enable large structures such as storage tanks to be calibrated in approximately 30 minutes, which is considerably shorter than conventional calibration times. In addition, the calibration methods of the present invention do not require point set registration which allows for greater ease in mapping the entire surface of a large structure in a short period of time. More generally, the present invention provides an efficient and highly accurate technique for creating a three-dimensional reconstruction of a large structure from a single absolute frame of reference that surpasses the performance of existing structural mapping techniques.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of calibrating a structure comprising:
   securing a first end of a tether to a device at a fixed location on an external surface of the structure;
   attaching an unmanned aerial vehicle to the second end of the tether;
   moving the unmanned aerial vehicle in a trajectory around the structure while the tether is extended and in tension;
   scanning the external surface of the structure over a course of the trajectory using the unmanned aerial vehicle to obtain a mapping of the external surface of the structure;
   determining a position of the unmanned aerial vehicle with respect to the fixed device; and
   calibrating the structure, by using a control unit of the unmanned aerial vehicle, based on i) the determined position of the unmanned aerial vehicle with respect to the fixed device, and ii) the mapping of external surface of the structure.

2. The method of claim 1, wherein the trajectory is a circular path around the structure.

3. The method of claim 1, wherein the fixed device includes a tether spool having an angular encoder, and a strain sensor.

4. The method of claim 1, wherein the unmanned aerial vehicle includes a laser scanning device that creates a point cloud of the external surface of the structure during scanning.

5. A system for calibrating a structure comprising:
   a device located at a fixed location on an external surface of the structure;
   a tether having first and second ends and secured at the first end to the fixed device; and
   an unmanned aerial vehicle attached to the second end of the tether, the unmanned aerial vehicle including a scanning device,
   wherein the unmanned aerial vehicle is operative to move in a trajectory around the structure while tethered in tension to the fixed device and to scan the external surface of the structure over a course of the trajectory to obtain a mapping of the external surface of the structure,
   and wherein the structure is calibrated, using a control unit of the unmanned aerial vehicle, based on i) a known position of the unmanned aerial vehicle with respect to the fixed device, and ii) the mapping of external surface of the structure.

6. The system of claim 5, wherein the scanning device of the unmanned aerial vehicle is a LiDAR device.

* * * * *